US012654342B2

(12) United States Patent
Whinery

(10) Patent No.: US 12,654,342 B2
(45) Date of Patent: Jun. 16, 2026

(54) REUSABLE GIFT TAG WITH SAFETY CUTTER

(71) Applicant: Chris Whinery, Bixby, OK (US)

(72) Inventor: Chris Whinery, Bixby, OK (US)

( * ) Notice: Subject to any disclaimer, the term of this patent is extended or adjusted under 35 U.S.C. 154(b) by 89 days.

(21) Appl. No.: 18/445,949

(22) Filed: Apr. 10, 2024

(65) Prior Publication Data

US 2025/0319615 A1 Oct. 16, 2025

(51) Int. Cl.
*B26B 3/08* (2006.01)
*B26B 11/00* (2006.01)
*G09F 3/10* (2006.01)

(52) U.S. Cl.
CPC ................ *B26B 3/08* (2013.01); *B26B 11/00* (2013.01); *G09F 3/10* (2013.01)

(58) Field of Classification Search
CPC .............. B26B 3/08; B26B 11/00; G09F 3/10
USPC ................................................................ 30/2
See application file for complete search history.

(56) References Cited

U.S. PATENT DOCUMENTS 1,422,773 A * 7/1922 Mccarthy ............. G03D 15/006 15/236.08
2,220,309 A * 11/1940 Wilms .................. B26B 27/005 30/2
2,753,105 A * 7/1956 Werner .................. B65D 75/70 30/162
4,205,440 A * 6/1980 Morgan ................ B26B 27/005 30/294
5,524,348 A * 6/1996 Tipp .......................... B67B 7/30 30/294
5,555,624 A * 9/1996 McCracken ............ B26B 27/00 30/294
5,884,837 A * 3/1999 Jacobsson .............. B65D 75/70 30/2
6,513,249 B2 * 2/2003 Linton .................... B26B 29/06 30/294
6,557,262 B1 * 5/2003 Clemence ............... B44C 7/025 30/2
7,296,353 B1 * 11/2007 Jackson ................ B26B 27/005 30/2
8,141,256 B1 * 3/2012 Siblik ..................... B26B 5/001 30/294
9,737,999 B2 * 8/2017 Kommer ................... B26B 1/02
2003/0019337 A1 * 1/2003 Hatanaka .................. B67B 7/44 30/294
2012/0096720 A1 * 4/2012 Neubauer ................. B26B 3/08 30/289
2021/0308881 A1 * 10/2021 Votolato .................... B26B 5/00

* cited by examiner

*Primary Examiner* — Omar Flores Sanchez
(74) *Attorney, Agent, or Firm* — Randal Homburg

(57) ABSTRACT

A reusable gift tag with a safety cutter provides for repeated use of a gift tag by including a front surface with an erasable panel, a rear surface with a dual surface tape segment and a perimeter margin having a serrated section for cutting tape, paper and cardboard without causing a potential cutting injury to a person.

2 Claims, 3 Drawing Sheets

REUSABLE GIFT TAG WITH SAFETY CUTTER

CROSS REFERENCE TO RELATED APPLICATIONS

None.

I. BACKGROUND OF THE INVENTION

1. Field of Invention

A reusable gift label having a frame with an erasable front panel, a rigid border, a reusable or replaceable adhesive rear strip on a rear surface and at least one margin defining a safety cutting edge for cutting paper or cardboard without posing a cutting risk to the user.

2. Description of Prior Art

A preliminary review of prior art patents was conducted by the applicant which reveal prior art patents in a similar field or having similar use. However, the prior art inventions do not disclose the same or similar elements as the present reusable gift tag, nor do they present the material components in a manner contemplated or anticipated in the prior art.

There are gift tags that present a panel within a frame which have either a chalk board panel for writing messages and names or plastic labels that appear to be capable of writing using an erasable marker which can be cleared using water or other solvent to remove the ink. These are not patent items, but items which are found on a general information search on the web. It appears that any number of attachments can be used, including simple tape. It is also know in the field of package cutters and paper cutters that safety cutting devices are presented in items including plastic cutlery, packaging industry tools and children-level toys for PLAY DOH® toys.

The present gift tag and safety cutter provide one or more labels having a plastic or composite frame providing a front surface with an erasable writing panel, and rear surface with a reusable or replaceable adhesive strip and at least one edge with a serrated margin for use to cut tape or cardboard of a package or gift box without presenting a cutting safety hazard to children or adults. The prior art contains no such patent or patent application.

II. SUMMARY OF THE INVENTION

Opening packages and gifts is a joyous occasion, except for the cleanup. Often the amount of trash is extensive, especially considering the fact that most of the paper, ribbon and tape used to wrap the gifts and packages end up in a trash bag after a single use. Paper is torn, ribbon is rolled up into manageable wads and cardboard end up on the recycle bin once the gifts are removed. In many instances, the gifts can get comingled with the trash.

The present reusable gift label with safety cutters are provided to encourage reuse of some or part of the gift and package wrapping materials. The reusable and erasable writing panel provide for repeated writing of names or messages with the ability to be erased and relabeled for subsequent use. The reusable or replaceable adhesive panel provide for attaching the reusable gift label to a package or wrapping paper and removing it for multiple subsequent uses by either replacing the adhesive strip or reapplying the adhesive strip if there is an tackiness left after a previous use. Finally, the cutting edge provides for the cutting of tape used when applying the gift wrapping paper so that it may be refolded and used again and also provides the safety cutter to cut the tape on the gift box or packaging when opening the gift, also allowing for reuse of a cardboard gift box or package.

In these time of reducing the amount of trash for responsible recycling, this safety cutter will promote responsible reuse of gift materials, reduce waste and trash and also provide a safe means for adults and small children to use as a cutting means during gift opening with a readily handy multiple-use reusable gift label and safety cutter.

III. DESCRIPTION OF THE DRAWINGS

The following drawings are submitted with this utility patent application.

IV. DESCRIPTION OF THE PREFERRED EMBODIMENT

Gift tags traditional provide a single use paper product with a simple application to gifts or package to identify to whom and from whom the package or gift is intended, with some possible pre-printed message identify an occasion or event. They come in bulk and may be attached to a gift by a string or an adhesive attaching means. The packages or gift are often wrapped with paper or plastic wrap covering a cardboard or paper box sealed with tape, possible before being wrapped with the paper or plastic wrap. Little concern is given to reuse of gift wrapping or preparation products, most of it ending up a trash. In a small way, and possibly a larger incentive for reuse is provided by the present reusable gift tag and safety cutter. Under no claim is this reusable gift tag and safety cutter intended to revolutionize the gift industry or provide a solution to recycled gifting materials, but it might provide a start to responsible recycling of these gifting materials.

Figure 1:
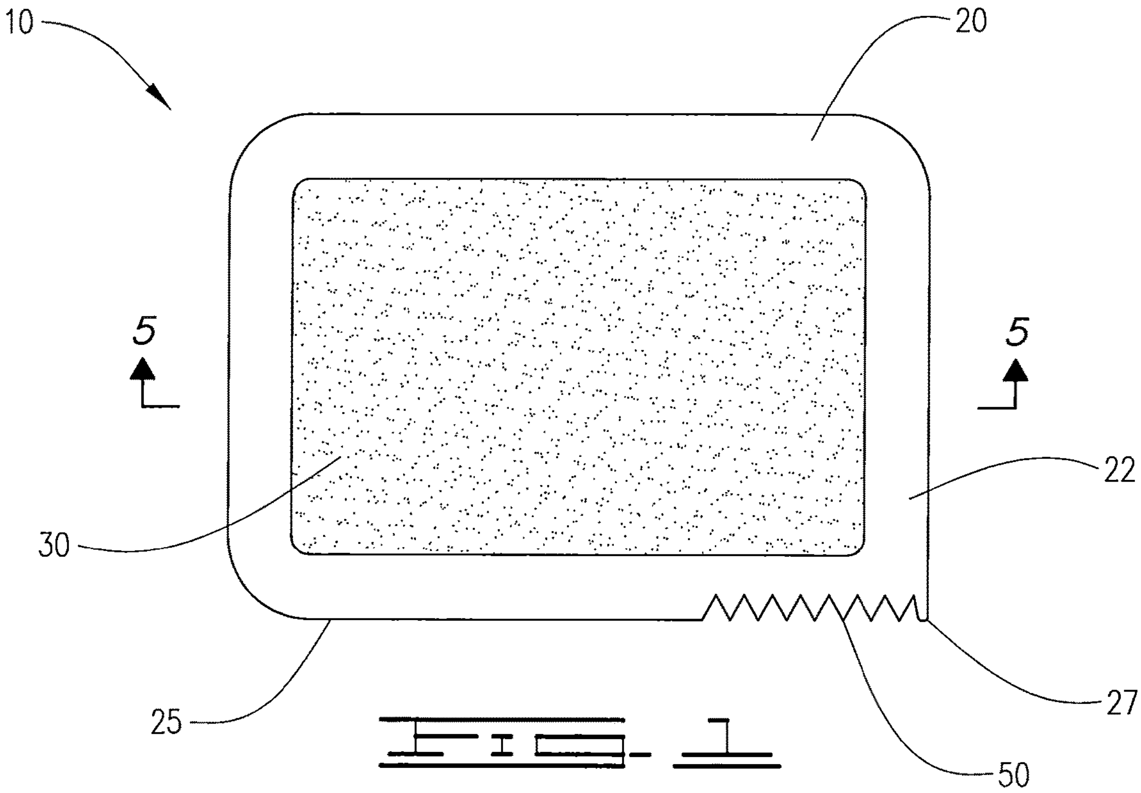
FIG. 1 is a front panel view of the reusable gift tag with a safety cutter, presenting the erasable panel within the frame.
Figure 2:
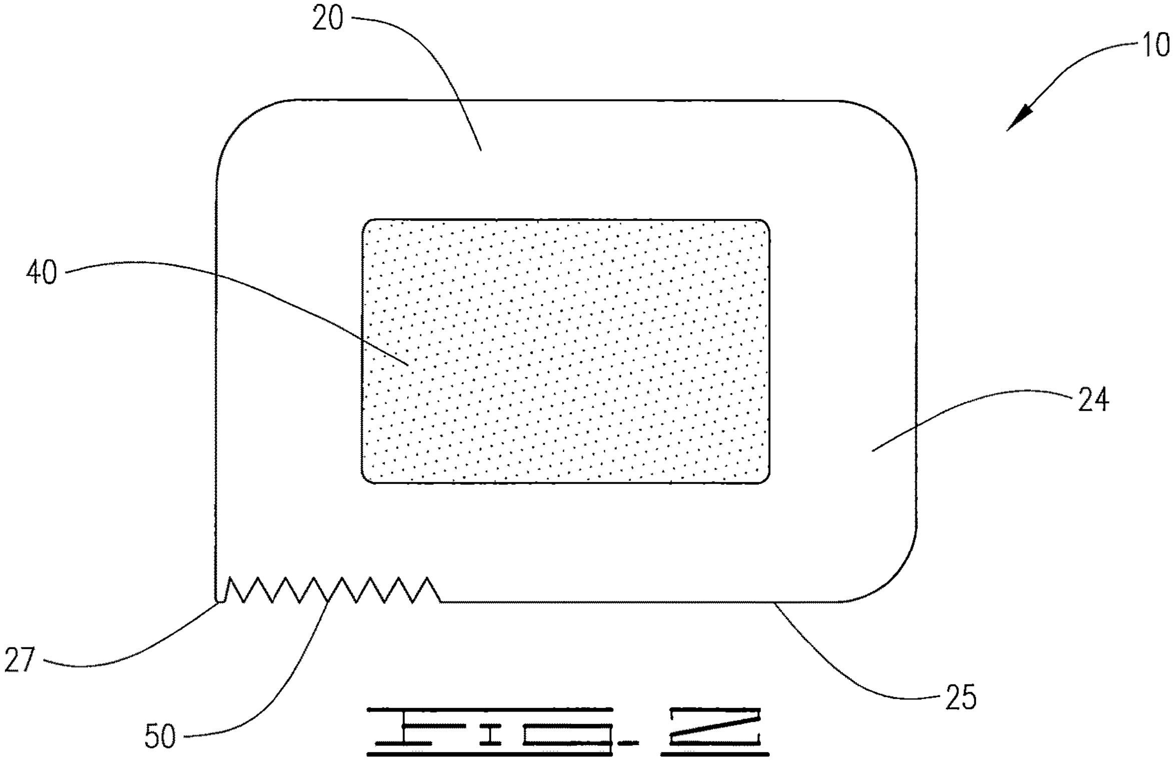
FIG. 2 is a rear view of the reusable gift tag with safety cutter, presenting the adhesive strip attached to the rear surface of the frame.
Figure 3:
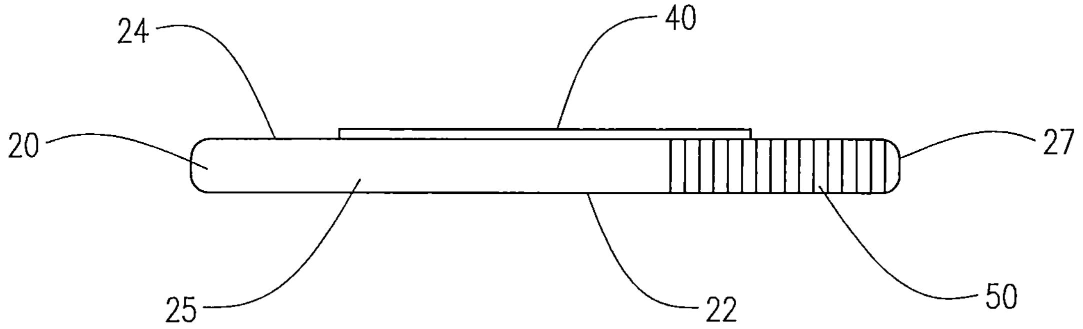
FIG. 3 is a bottom edge view of the reusable gift tag with the safety cutter showing the adhesive strip attached to the rear surface.
Figure 4:
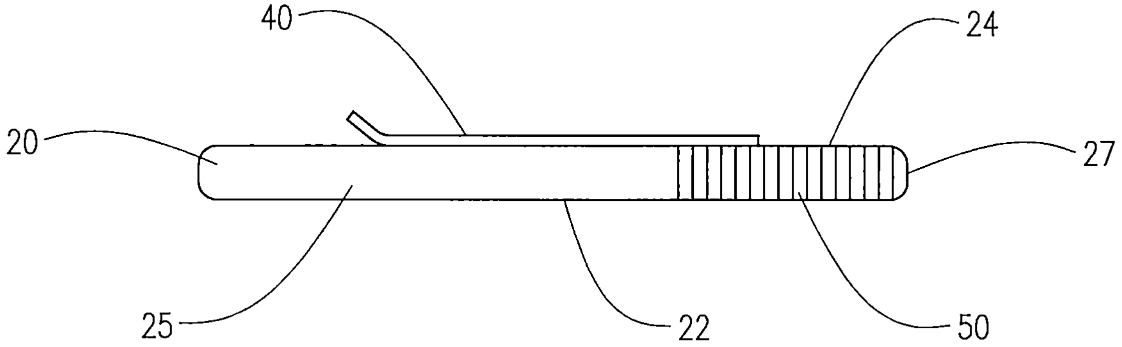
FIG. 4 is the same bottom edge view of the reusable gift tag with the safety cutter showing a partial detachment of the adhesive strip from the rear surface to remove or replace the adhesive strip when no longer reusable.
Figure 5:
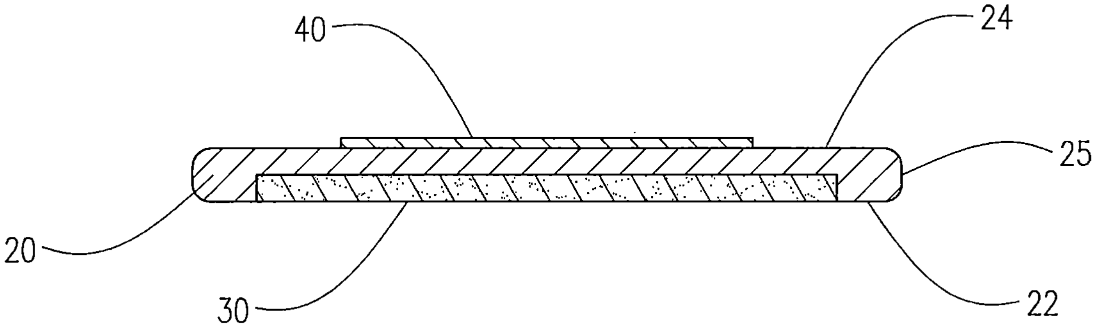
FIG. 5 is a sectional view along section lines 5/5 of FIG. 1.
Figure 6:
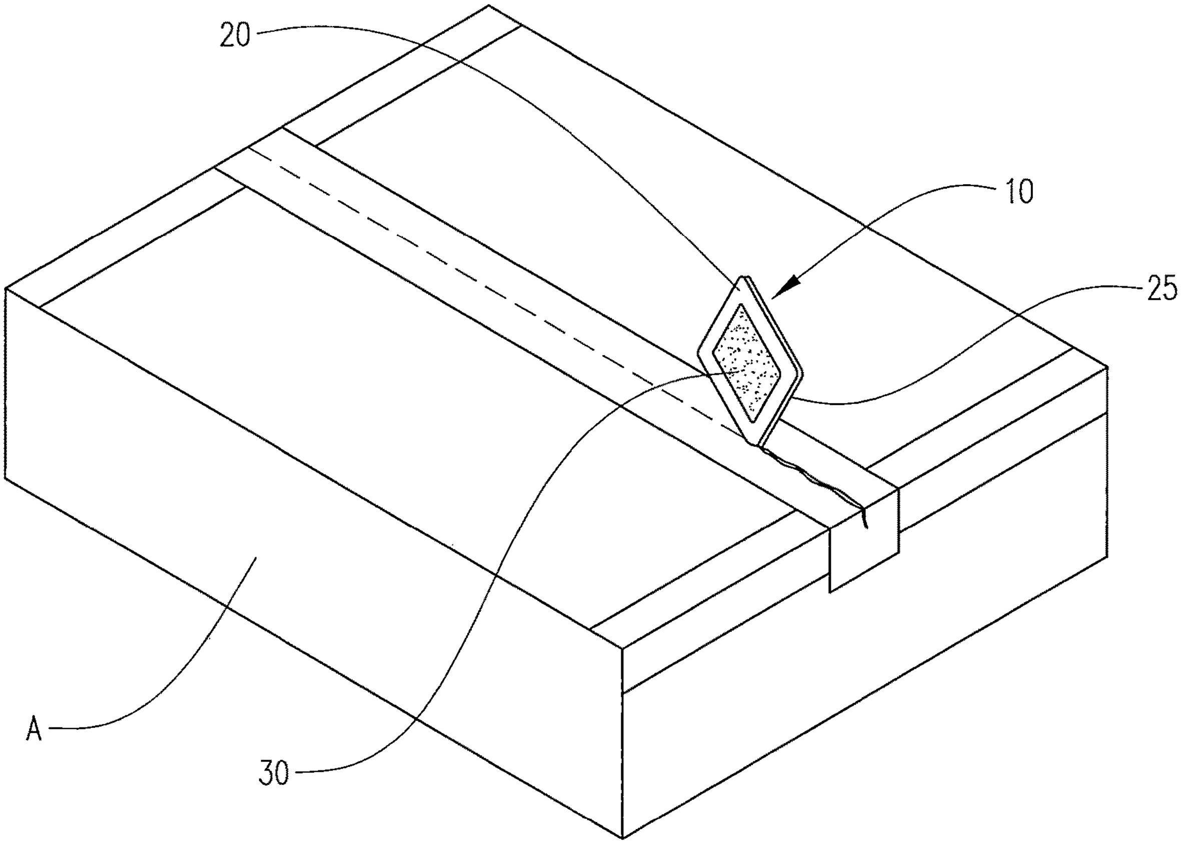
FIG. 6 is a perspective view of the reusable gift tag with the safety cutter in use to cut through packaging tape on a gift box or package.

The reusable gift tag and safety cutter 10, FIGS. 1-6, provides a frame 20 defining a front surface 22, a rear surface 24 and a perimeter margin 25. The front surface 22, FIG. 1, contains an erasable front panel 30 for applying an erasable ink or pencil. The rear surface 24, FIG. 2, provides a location for the application of a dual sided adhesive tape segment 40 to be applied to the gift or package A which is reusable and/or replaceable, FIG. 4. On at least one corner 27 or location on the perimeter margin 25 is a serrated safety cutting edge 50 which will cut through tape, paper or cardboard A with a light sawing motion, FIG. 6, but will not cut a person unless some overly aggressive force is applied. The purpose of the erasable front panel 30 is to print a new and unique message or gift instruction for each use-varying from weddings, to birthdays to holidays or romantic occasions. The purpose of the reusable or replaceable dual sided adhesive tape segments 40 is to ensure that useful adhesion of the reusable gift tag and safety cutter is capable and productive. When the adhesion has failed, the exhausted dual sided adhesive tape segment 40 can be replaced easily by peeling it away from the rear surface 24, FIG. 4, and using fresh dual sided adhesive tape segment 40, either provided at the time of sale with multiple dual sided adhesive tape segments 40 provided in a package containing the reusable gift tags with safety cutters at the time of purchase or as an aftermarket purchase of components of just the dual sided adhesive tape segments 40, as contemplated within the scope of this product.

The erasable front panel 30 has the capability of being written upon by a compatible writing instrument, not shown, which is already available on the market. Thus, the erasable front panel 30 should either provide instructions for a compatible writing instrument or be accompanied by one in a marketed package. For example, if the erasable front panel 30 were a chalkboard, the chalk should be used. If the erasable front panel 30 were a dry board, then an erasable marker would be compatible. If the erasable front panel 30 were a slick surface, then some type of rub-off instrument would be compatible. There are certainly more than one specific possibility.

The reusable adhesive medium would be some type of composition that remained tacky before, during and after use, but formed no permanent bond with a surface to which it would be applied. The tackiness would remain for a prolonged and repetitive number of applications. However, since nothing typically lasts forever, the ability to remove the dual adhesive tape segment 40 and replacing it with a new dual adhesive tape segment would enhance the useful and reusable nature of the product as a whole, the remaining elements remaining useful potentially for years.

The safety cutter incorporated into at least one location of the perimeter margin may be provided with the same serration or cutting means as a plastic picnic fork. The serrations are rigorous, but not sharp, and would break away before cutting through a finger. With light sawing motions or pull, the serrated cutting edge 50 should cut through tape, cardboard and paper that generally comprises the gift package A to assist in a careful opening of a package, preserving these items for secondary use, FIG. 6 without having to use a sharper and more dangerous cutting item.

While the reusable gift tag and safety cutter 10 has been particularly shown and described with reference to a preferred embodiment thereof, it will be understood by those skilled in the art that changes in form and detail may be made therein without departing from the spirit and scope of the invention.

What is claimed is:

1. A reusable gift tag and safety cutter comprising:

a frame defining a front surface, a rear surface, and a perimeter margin;

an erasable front panel on said front surface upon which a message can be inscribed may be erased after use;

a dual sided adhesive tape segment applied to said rear surface further applied to a package which is reusable and replaceable;

at least one corner on said perimeter margin defining a serrated safety cutting edge with a capacity to cut through tape, paper or cardboard on said package with a light sawing motion, without posing a cutting potential to human tissue.

2. The reusable gift tag and safety cutter of claim 1, said dual sided adhesive tape segment comprising removability after failure of adhesion to either said rear surface of said gift and replacement by another fresh dual sided adhesive tape segment.

* * * * *